Patented Oct. 2, 1928.

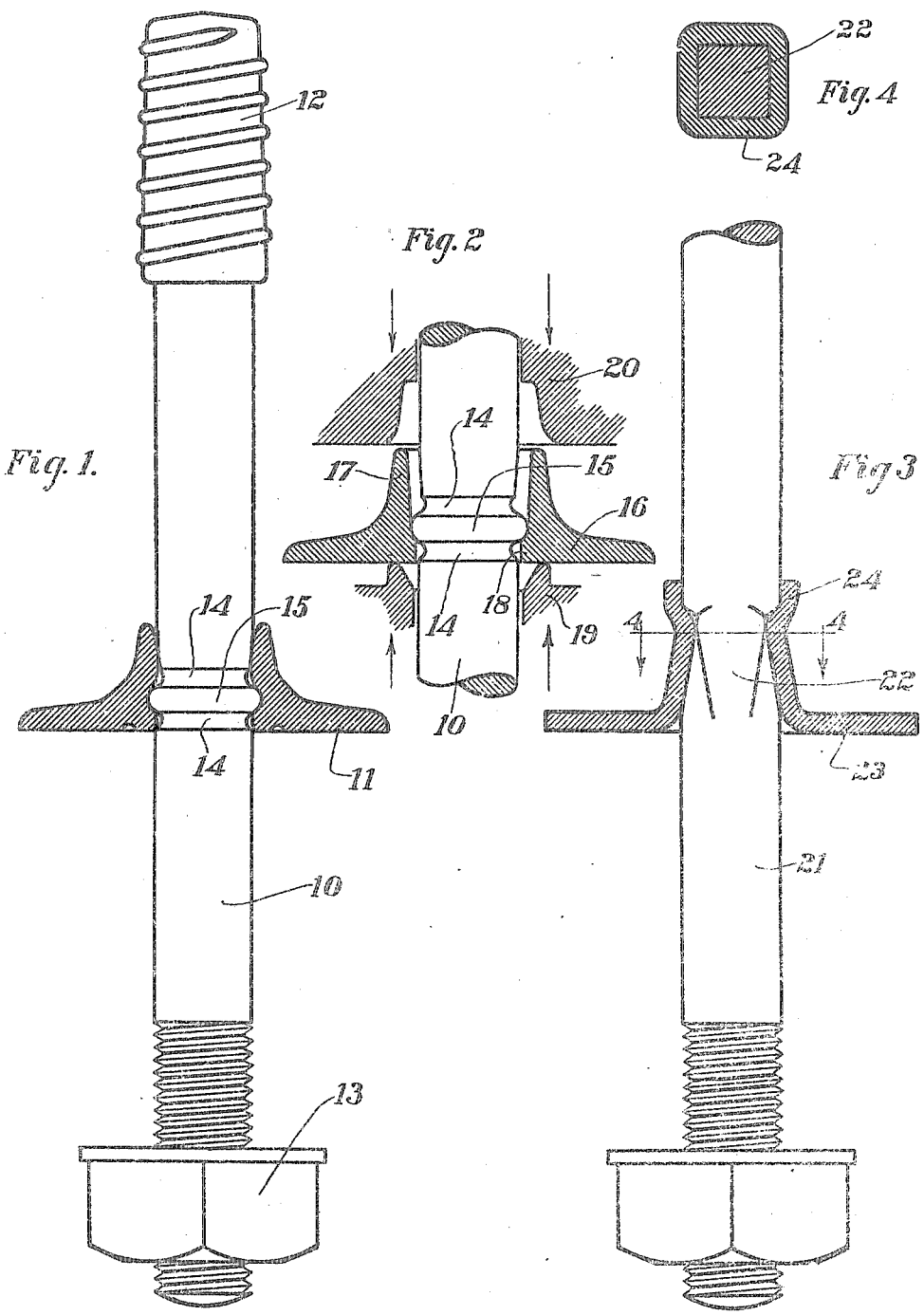

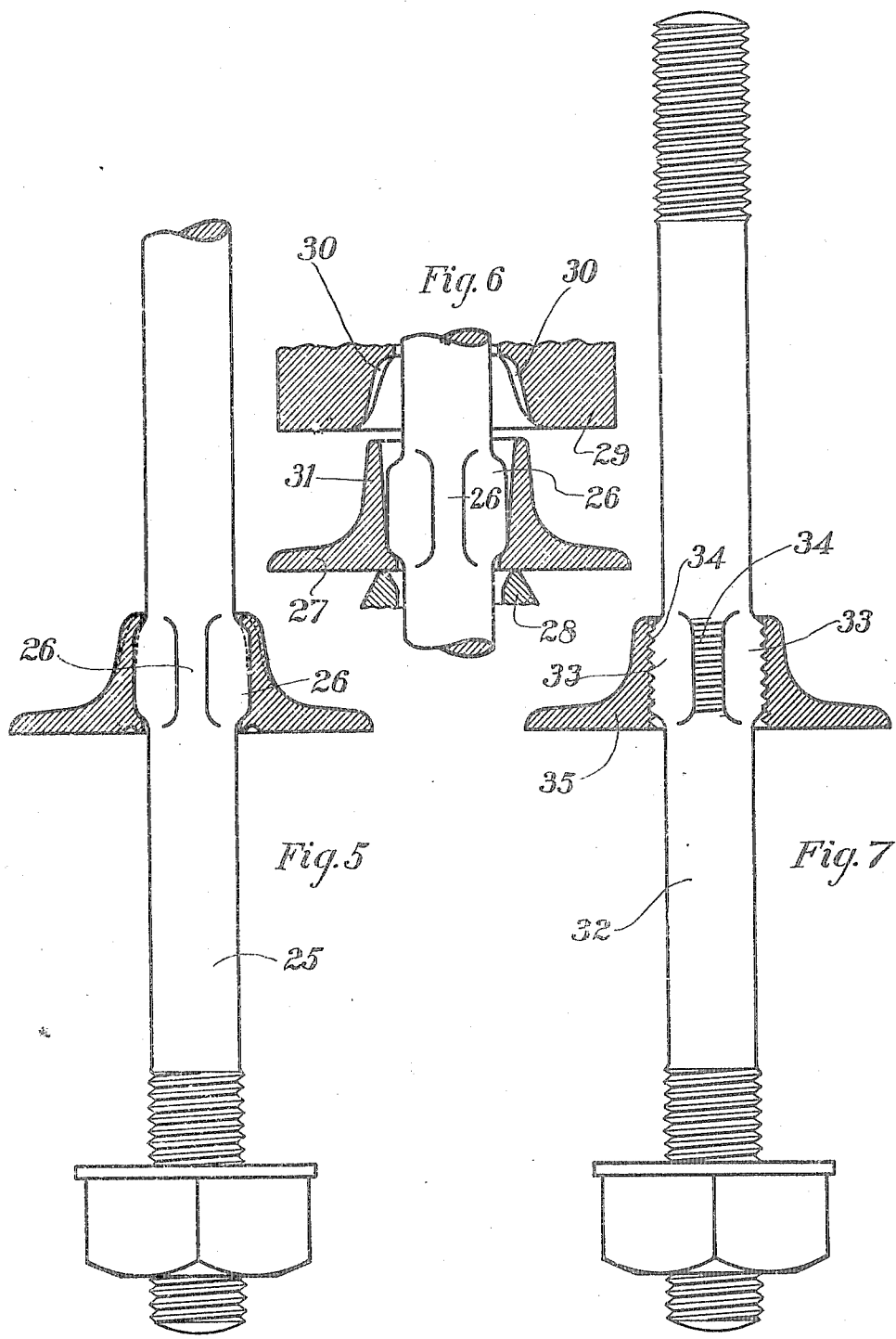

1,685,834

UNITED STATES PATENT OFFICE.

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY.

PROCESS OF MANUFACTURING INSULATOR PINS.

Application filed August 2, 1922. Serial No. 579,134.

This invention relates to pins for supporting insulators or for similar purposes and has for its object the production of devices of the class named which can be economically manufactured and will be well adapted to withstand the mechanical stress to which they are subjected and which shall be of improved construction and operation.

The invention is exemplified in the combination and arrangement of parts shown in the accompanying drawings and described in the following specification and it is more particularly pointed out in the appended claims.

In the drawings:

Fig. 1 is an elevation with parts in section showing one embodiment of the present invention.

Fig. 2 illustrates one step in the process of manufacturing the device shown in Fig. 1.

Fig. 3 is a view similar to Fig. 1 showing a modified form of construction.

Fig. 4 is a section substantially on line 4—4 of Fig. 3.

Fig. 5 is a view similar to Fig. 1 showing another modification.

Fig. 6 illustrates a step in the process of manufacturing the form shown in Fig. 5.

Fig. 7 is another view similar to Fig. 1 showing a different form of the invention.

Insulator pins for use in connection with cross arms or similar supports are commonly provided with a shank which projects through the cross arm and with a flange or other support secured to the pin above the cross arm and resting thereon. Where wooden cross arms are used it is an advantage to have the lower portion of the pin large enough to provide a somewhat extended bearing on the inner face of the opening through the cross arm. It is also desirable to secure the support at the top of the cross arm, to the pin in such a manner that the strength of the pin is not materially affected.

The present invention provides a pin having the above and other desirable qualities and also affords an economical method of manufacturing such pins.

In Fig. 1 of the drawing there is illustrated a pin (10) having a flange (11) secured thereto between the ends of the pin, the upper and lower portions of the pin preferably being of substantially equal diameters. A thimble (12) or other bearing for the insulator is carried at the top of the pin and a nut (13) is threaded on the lower end of the pin to hold it in place on the cross arm. Between the upper and lower ends of the pin there is formed a pair of peripheral grooves (14) with an intermediate flange or bead (15). These deformations may be rolled into the pin or stamped with a die or formed by any other suitable manufacturing process. The stock from the grooves (14) will furnish the material for the bead (15) which will usually be pressed outwardly to a diameter greater than that of the bar (10). After the deformations (14) and (15) have been formed, a supporting flange (16) is placed in position about the pin as shown in Fig. 2. The flange (16) is provided with a sleeve portion (17), the opening of which is preferably slightly flared as shown in the figure and provided with a shoulder portion (18) for engaging the rib (15) to properly locate the flange on the pin. A pair of dies (19) and (20) are then moved along the pin (10) in the direction of the arrow shown in Fig. 2 so as to clamp the flange pin so that it will take a position substantially like that shown in Fig. 1. The lower die (19) will force a portion of the metal into the groove (14) and the upper die will form the sleeve portion (17) about the rib (15) so that a tight connection is provided between the supporting flange and the pin. It will be noted that the upwardly projecting sleeve provides a reinforcement for the pin at the point where it will be subjected to greatest stress. The pin at the top of the flange has its full diameter and the portion of the pin within the cross arm is also full size.

In the form shown in Fig. 3 the pin (21) is provided with a squared portion (22) which receives a supporting flange (23). The squared surface (22) may be formed by transversely operating dies, by forging or by any suitable manufacturing process. The flange (23) is provided with an upwardly projecting sleeve (24) which may originally have a cylindrical shape corresponding to a major portion of pin (21). This sleeve is slid over the pin until it registers in the squared portion (22), when it is pressed inwardly by dies moving transversely of the pin or by any other suitable process. This form of construction is similar in its function to that of the structure shown in Fig.

1 except that the flange and pin in Fig. 3 have a more positive lock against relative rotary movement than is present in Fig. 1. In Fig. 5 the pin (25) is provided with radially projecting flanges (26) which may be formed from the pin stock by dies operated transversely of the pin or by other suitable manufacturing processes. A supporting flange (27) similar to that shown in Fig. 2 is placed upon the pin (25) in registration with the flanges (26) and is squeezed inwardly about the flanges by dies (28) and (29), operating in a manner described in connection with Fig. 2. The die (29) is provided with a recess (30), registering with the flanges (26) so that the material of the sleeve (31) may be formed inwardly about the flange (26) to hold the pin and support against relative rotation as well as against movement in the direction of the length of the pin. In the form shown in Fig. 7 a pin (32) has flanges (33) formed thereon similar to flanges (26) on Fig. 5. The outer edge of the flanges (33) are then threaded as shown at (34) and the supporting flange (35) is screwed into place on the thread (34). The thread alone may retain the flange and pin in proper position meshed to the pin by means of dies similar to those shown in connection with Figs. 2 and 6.

I claim:—

1. The process of manufacturing insolator pins, comprising the steps of deforming a bar to provide a projection thereon, placing on said bar in registration with said projection, a supporting member having an opening therein to receive said bar, and then pressing said supporting member to form the material thereof about said projection.

2. The method of manufacturing insulator pins, comprising the steps of deforming a pin at a position between the ends thereof to provide abutments for resisting passage of a member along said pin, placing a sleeve having a flange thereon on said pin, and pressing said sleeve inwardly to fit closely against said abutments at opposite sides thereof in the direction of the length of said pin in position to support said pin.

3. The method of manufacturing insulator pins, comprising the steps of forcing inwardly portions of the surface of said pin to cause the material at adjacent portions to flow outwardly and thus form an uneven surface, placing a sleeve having a projection thereon on said pin in registration with said surface and encasing the portion of said pin where the surface is pressed inwardly, and pressing the material of said sleeve into depressions in said surface at both ends of said sleeve to lock said sleeve on said pin.

4. The method of manufacturing insulator pins, comprising the steps of deforming a pin body of substantially uniform cross-section throughout its length at a position intermediate the ends thereof by forcing portions of the material thereof inwardly and thus forming abutments to resist longitudinal rotary movement relative to said pin, placing a sleeve having an opening therethrough and a flange thereon on said pin in registration with said abutment and in position to encase the inwardly forced portions of said pin, and forcing said sleeve about said abutment at each end of said sleeve by pressure exerted from opposite directions on said sleeve in the direction of the length of said pin.

5. The method of manufacturing insulator pins, comprising the steps of providing a pin body with a roughened surface, placing a sleeve about said pin body in registration with said surface and extending beyond said surface at both ends thereof in the direction of the length of said pin, and moving a die along the pin against said sleeve to force said sleeve against said surface and lock the sleeve to the pin.

6. The method of manufacturing insulator pins, comprising the steps of deforming the surface of a pin body intermediate its ends, placing a sleeve having an opening therethrough and a support attached thereto on said pin body in registration with said surface, forcing a die having a flaring face over said sleeve to press said sleeve against said surface, and supporting an abutment member at the end of said sleeve opposite said die, said abutment member having a projection thereon for forcing the metal of said sleeve at said opposite end against said pin body.

In testimony whereof I have signed my name to this specification on this 29th day of July, 1922.

ARTHUR O. AUSTIN.